(12) United States Patent
Cis et al.

(10) Patent No.: US 11,060,631 B2
(45) Date of Patent: Jul. 13, 2021

(54) SERVOVALVE

(71) Applicant: Hamilton Sundstrand Corporation, Charlotte, NC (US)

(72) Inventors: Marcin Cis, Lutynia (PL); Sebastian Zuraw, Opole (PL)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 71 days.

(21) Appl. No.: 15/984,493

(22) Filed: May 21, 2018

(65) Prior Publication Data
US 2019/0024818 A1    Jan. 24, 2019

(30) Foreign Application Priority Data

Jul. 20, 2017 (EP) ................................... 17461572

(51) Int. Cl.
     *F16K 31/42*      (2006.01)
     *F16K 11/07*      (2006.01)
     (Continued)

(52) U.S. Cl.
     CPC ........ *F16K 31/426* (2013.01); *F15B 13/0436* (2013.01); *F16K 11/0716* (2013.01);
     (Continued)

(58) Field of Classification Search
CPC .... F16K 31/426; F16K 11/0716; F16K 51/00; F16K 1/221; F16K 31/043; F16K 11/0708; F16K 31/128; F16K 31/0682; F15B 13/0436; F15B 19/005; F15B 9/07; F15B 13/0402; F15B 21/041; F15B 2211/615;
(Continued)

(56) References Cited

U.S. PATENT DOCUMENTS 2,797,666 A * 7/1957 Chubbuck ................. F15B 9/17
                                                                      91/38
2,884,907 A * 5/1959 Atchley .............. F15B 13/0436
                                                                     137/48
(Continued)

FOREIGN PATENT DOCUMENTS

EP        3321513 A1    5/2018
GB        2104249 A     3/1983

OTHER PUBLICATIONS

Extended European Search Report for International Application No. 17461572.4 dated Feb. 7, 2018, 7 pages.

*Primary Examiner* — Craig J Price
(74) *Attorney, Agent, or Firm* — Cantor Colburn LLP

(57) ABSTRACT

A servovalve includes: a fluid transfer valve assembly comprising a supply port and a control port; a moveable valve spool arranged to regulate flow of fluid from the supply port to the control port in response to a control signal; and a jet pipe assembly configured to axially move the valve spool relative to the fluid transfer assembly in response to the control signal to regulate the fluid flow. The spool includes a tubular body defining a path for fluid flow, the tubular body closed at each end by a respective end cap having openings via which, in use, fluid enters the interior of the spool. The end caps extend within the tubular body at least to an extent that they overlap the openings, and wherein the end caps are provided with filter means for filtering the fluid from the openings as it enters the spool.

14 Claims, 5 Drawing Sheets

(51) Int. Cl.
  *F15B 13/043* (2006.01)
  *F16K 51/00* (2006.01)
  *F15B 9/06* (2006.01)
  *F15B 9/07* (2006.01)

(52) U.S. Cl.
  CPC ............... *F16K 51/00* (2013.01); *F15B 9/06* (2013.01); *F15B 9/07* (2013.01); *Y10T 137/86702* (2015.04)

(58) Field of Classification Search
  CPC .. F15B 13/00–16; F15B 9/00–17; F15B 9/06; F02D 9/1065; F02D 11/107; H02K 11/001; H02K 26/00; Y10T 137/2322; Y10T 137/2365; Y10T 137/2409; Y10T 137/2452; Y10T 137/8659; Y10T 137/86598; Y10T 137/86606; Y10T 137/86614; Y10T 137/86622; Y10T 137/8663; Y10T 137/8671; Y10T 137/794; Y10T 137/7976; Y10T 137/8013; Y10T 137/8049; Y10T 137/8085; Y10T 137/8122; Y10T 137/86702
  USPC ............ 137/83, 85, 625.61–625.64, 625.66, 137/625.69, 544–550, 625.68; 91/47, 91/359, 365, 388, 402, 444; 60/403, 406, 60/460; 251/14, 129.03
  See application file for complete search history.

(56) References Cited

U.S. PATENT DOCUMENTS

| | | | |
|---|---|---|---|
| 2,977,985 A | 4/1961 | Ericson et al. | |
| 3,017,864 A * | 1/1962 | Atchley | F15B 9/07 91/3 |
| 3,029,830 A * | 4/1962 | Klover | F15B 13/0438 137/82 |
| 3,081,787 A | 3/1963 | Meulendyk | |
| 3,217,728 A * | 11/1965 | Pegram | F15B 13/0436 137/83 |
| 3,331,383 A * | 7/1967 | Buchanan | F15B 13/0436 137/83 |
| 3,698,437 A | 10/1972 | Cox | |
| 3,789,880 A * | 2/1974 | Armstrong | F16K 3/26 137/625.3 |
| 3,922,955 A * | 12/1975 | Kast | F15B 11/128 91/461 |
| 4,046,061 A | 9/1977 | Stokes | |
| 4,227,443 A * | 10/1980 | Toot | F15B 13/0436 137/625.61 |
| 4,742,678 A * | 5/1988 | Bartholomew | F03G 7/06 385/147 |
| 4,922,964 A | 5/1990 | Buscher | |
| 5,088,383 A * | 2/1992 | Wardle | F15B 13/07 137/596.15 |
| 5,156,189 A * | 10/1992 | Tranovich | F15B 13/043 137/625.63 |
| 6,648,014 B1 * | 11/2003 | Takahashi | F15B 13/0438 137/545 |
| 6,786,238 B2 | 9/2004 | Frisch | |
| 7,290,565 B2 * | 11/2007 | Achmad | C09B 67/0015 137/625.61 |
| 7,487,752 B2 * | 2/2009 | Strauss | F15B 21/041 123/90.17 |
| 9,309,900 B2 | 4/2016 | Kopp | |
| 9,897,116 B2 * | 2/2018 | Ozzello | F15B 13/0436 |
| 10,563,675 B2 * | 2/2020 | Cis | F15B 13/0402 |
| 10,731,673 B2 * | 8/2020 | Cis | F15B 13/0402 |
| 2006/0216167 A1 * | 9/2006 | Achmad | C09B 67/0015 417/375 |
| 2015/0047729 A1 | 2/2015 | Kopp et al. | |
| 2018/0135661 A1 * | 5/2018 | Cis | F15B 9/07 |
| 2018/0340555 A1 * | 11/2018 | Cis | F16K 31/128 |

* cited by examiner

SERVOVALVE

FOREIGN PRIORITY

This application claims priority to European Application No. 17461572.4 filed Jul. 20, 2017, the entire contents of which is incorporated herein by reference.

TECHNICAL FIELD

The present disclosure relates to servovalves used to transfer quantities of, or manage the flow of fluid e.g. air.

BACKGROUND

Servovalves find a wide range of applications for controlling air or other fluid flow to effect driving or control of another part e.g. an actuator.

A servovalve assembly includes a motor controlled by a control current which controls flow to a valve e.g. an air valve to control an actuator. Generally, a servovalve transforms an input control signal into movement of an actuator cylinder. The actuator controls e.g. an air valve. In other words, a servovalve acts as a controller, which commands the actuator, which changes the position of an air valve's (e.g. a so-called butterfly valve's) flow modulating feature.

Such mechanisms are used, for example, in various parts of aircraft where the management of air/fluid flow is required, such as in engine bleeding systems, anti-ice systems, air conditioning systems and cabin pressure systems. Servovalves are widely used to control the flow and pressure of pneumatic and hydraulic fluids to an actuator, and in applications where accurate position or flow rate control is required.

Conventionally, servovalve systems operate by obtaining pressurised fluid from a high pressure source which is transmitted through a load from which the fluid is output as a control fluid. Various types of servovalves are known—see e.g. GB 2104249, US 2015/0047729 and U.S. Pat. No. 9,309,900.

Electrohydraulic servovalves can have a first stage with a motor, e.g. an electrical or electromagnetic force motor or torque motor, controlling flow of a hydraulic fluid to drive a valve member e.g. a spool valve of a second stage, which, in turn, can control flow of hydraulic fluid to an actuator for driving a load. The motor can operate to position a moveable member, such as a flapper, in response to an input drive signal or control current, to drive the second stage valve member e.g. a spool valve.

Particularly in aircraft applications, but also in other applications, servovalves are often required to operate at various pressures and temperatures. For e.g. fast acting air valve actuators, relatively large flows are required depending on the size of the actuator and the valve slew rate. For such high flow rates, however, large valve orifice areas are required. For 'flapper' type servovalves, problems arise when dealing with large flows due to the fact that flow force acts in the direction of the flapper movement and the motor is forced to overcome the flow forces. For clevis-like metering valves such as described in U.S. Pat. Nos. 4,046,061 and 6,786,238, the flow forces, proportional to the flow, act simultaneously in opposite directions so that the clevis is balanced and centred. The clevis, however, needs to be big due to the requirement for bigger orifices to handle larger flows.

Jet pipe servovalves provide an alternative to 'flapper'-type servovalves. Jet pipe servovalves are usually larger than flapper type servovalves but are less sensitive to contamination. In jet pipe systems, fluid is provided via a jet pipe to a nozzle which directs a stream of fluid at a receiver. When the nozzle is centred—i.e. no current from the motor causes it to turn, the receiver is hit by the stream of fluid from the nozzle at the centre so that the fluid is directed to both ends of the spool equally. If the motor causes the nozzle to turn, the stream of fluid from the nozzle impinges more on one side of the receiver and thus on one side of the spool more than the other causing the spool to shift. The spool shifts until the spring force of a feedback spring produces a torque equal to the motor torque. At this point, the nozzle is centred again, pressure is equal on both sides of the receiver and the spool is held in the centred position. A change in motor current moves the spool to a new position corresponding to the applied current.

As mentioned above, jet pipe servovalves are advantageous in that they are less sensitive to contamination e.g. in the supply fluid or from the valve environment. These valves are, however, more complex and bulkier. Additional joints are required for the fluid supply pipe and the supply pipe from the fluid supply to the jet pipe is mounted outside of the servovalve body in the torque motor chamber. In the event of damage to the pipe, this can result in external leakage. The pipe, being external, adds to the overall size and is more vulnerable to damage.

There is a need for a servovalve arrangement that can handle large fluid flows effectively, whilst retaining a compact design and being less vulnerable to contamination, damage and leakage.

European Patent Application 16461572 teaches a jet-pipe type servovalve wherein fluid is provided to the nozzle via a connector header in fluid communication with the interior of the spool, the spool being provided with one or more openings via which fluid from the supply port enters the interior of the spool and flows into the connector header and to the nozzle.

The servovalve includes drive means for steering the nozzle in response to the control signal. The drive means may include a motor such as a torque motor arranged to steer the nozzle by means of an induced current. Other drive means may be used to vary the position of the nozzle. The drive means may be mounted in a housing attached to the valve assembly.

The arrangement of EP 16461572 enables the conventional outside supply pipe to be removed and allows the jet pipe to be fed with fluid via the spool and a feedback spring. To avoid clogging of the jet pipe/nozzle etc. due to contamination in the fluid, the fluid should be filtered. Conventionally, the fluid will be filtered by an external filter before it enters the jet pipe. This, however, requires filter components to be incorporated in e.g. the connector header, which is difficult to do.

There is, therefore, a need to provide a simpler, more convenient and reliable fluid filtering in such a jet-pipe servovalve.

In one aspect, the present disclosure provides a spool for a servovalve, the spool comprising a tubular body defining a path for fluid flow, the tubular body closed at each end by a respective end cap; the spool further being provided with openings in the tubular body via which, in use, fluid enters the interior of the spool; and characterised in that the end caps extend within the tubular body at least to an extent that they overlap the openings, and wherein the end caps are provided with filter means for filtering the fluid from the openings as it enters the interior of the spool.

The present disclosure also provides a servovalve comprising: a fluid transfer valve assembly comprising a supply port and a control port; a moveable valve spool arranged to regulate flow of fluid from the supply port to the control port in response to a control signal; and a jet pipe assembly configured to axially move the valve spool relative to the fluid transfer assembly in response to the control signal to regulate the fluid flow; wherein the jet pipe assembly comprises a steerable nozzle from which fluid is directed to the ends of the spool in an amount determined by the control signal; and wherein fluid is provided to the nozzle via a connector header in fluid communication with the interior of the spool, the spool comprising a tubular body defining a path for fluid flow, the tubular body closed at each end by a respective end cap; the spool further being provided with openings in the tubular body via which, in use, fluid enters the interior of the spool; and characterised in that the end caps extend within the tubular body at least to an extent that they overlap the openings, and wherein the end caps are provided with filter means for filtering the fluid from the openings as it enters the interior of the spool.

The end cap may comprise a head part and a shaft, which is preferably a thin walled shaft, such that the head fits sealing at the end of the spool and the shaft extends along the inside Preferred embodiments will now be described with reference to the drawings.

DETAILED DESCRIPTION

A servovalve as described below can, for example, be used in an actuator control system. The servovalve is controlled by a torque motor to control a control flow of fluid that is output via e.g. a butterfly value to control the movement of an actuator.

Figure 1:
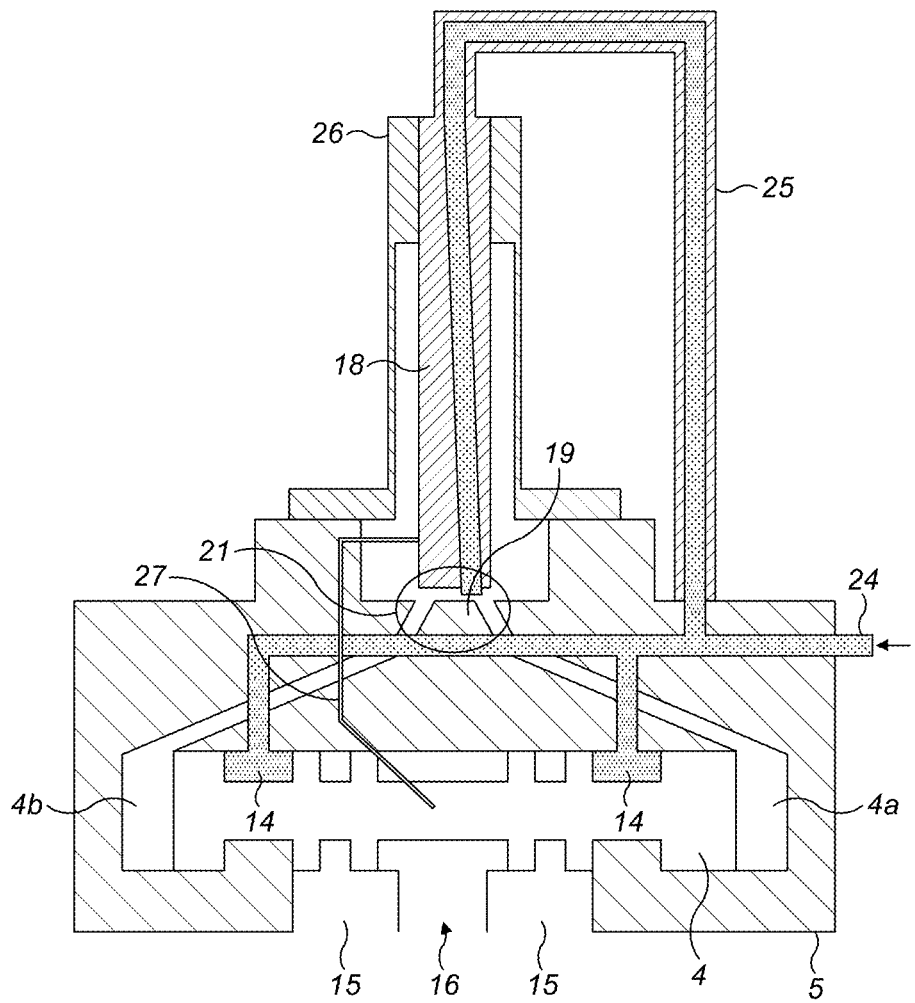
FIG. 1 is a schematic view of a conventional jet-pipe type servovalve.

A conventional jet pipe servovalve will first be described with reference to FIG. 1. The arrangement comprises a servovalve assembly have a torque motor and a moveable spool 4 mounted in a supporting block 5, or mounted in a cylinder mounted in a block. The spool is part of a spool assembly having: supply ports 14, control ports 15, and a return port 16. Flow is possible between the ports via a passage through the spool. The torque motor provides current that causes a jet pipe 18 to turn at its end closest to the spool, which end terminates in a nozzle 19. Supply fluid is provided from the supply port, via a supply pipe 25 to the top of the jet pipe—i.e. the end opposite the end with the nozzle, and the supply fluid flows through the jet pipe and out of the nozzle. A receiver 21 is provided in the block below the nozzle. The receiver provides two channels via which fluid from the nozzle 19 flows into the spool. When no current is applied by the motor to the jet pipe, the nozzle is centred relative to the receiver 21 and supply fluid exiting the nozzle flows equally through both channels and thus equally to both ends of the spool. The spool therefore remains centred—i.e. 'closed' so that no fluid flows through the control ports. When actuator control is desired, the motor provides a control current to the jet pipe causing the nozzle to turn away from the centred position. The supply fluid through the nozzle then flows predominantly through one receiver channel as compared to the other channel. More fluid flows, therefore, into the corresponding end of the spool causing axial movement of the spool with either blocks/occludes the passage between the supply port and the respective control port or opens the passage to allow flow between the two ports, depending on the axial position of the spool due to the position of the nozzle, thus modulating pressure on the control ports and controlling the actuator.

In an example, the assembly is arranged to control an actuator based on the fluid flow from the control port e.g. via a butterfly valve. The servovalve controls an actuator which, in turn, controls an air valve such as a butterfly valve.

Supply pressure is provided to the servovalve housing via supply port 24 and to the spool via spool supply ports 14. The pressure at return port 16 is a return pressure which will vary depending e.g. on the altitude of the aircraft in flight. Control ports 15 provide a controlled pressure, dependant on the nozzle position and resulting spool position, to be provided to an actuator. A supply pipe 25 is also connected to the supply port and routes supply fluid external to the spool and into the top end of the jet pipe. The supply fluid flows down the jet pipe to the nozzle and exits to the receiver described above. The jet pipe is preferably mounted in a flexural tube 26. While the nozzle is centred, equal amounts of fluid go to the two ends 4a,4b of the spool.

The spool 4 is in the form of a tubular member arranged in the block 5 to be moved axially by fluid from the jet pipe via the nozzle that is directed at the spool via the receiver. End caps seal the ends of the tubular member.

A feedback spring 27 serves to return the nozzle to the centred position.

In more detail, to open the servovalve, control current is provided to coils of the motor (e.g. a torque motor) creating electromagnetic torque opposing the sum of mechanical and magnetic torque already 'present' in the torque motor. The bigger the electromagnetic force from the coils, the more the jet pipe nozzle 19 turns. The more it turns, the greater the linear or axial movement of the spool 4. A torque motor usually consists of coil windings, a ferromagnetic armature, permanent magnets and a mechanical spring (e.g. two torsional bridge shafts). This arrangement provides movement of the nozzle proportional to the input control current. Other types of motor could be envisaged.

Figure 2:
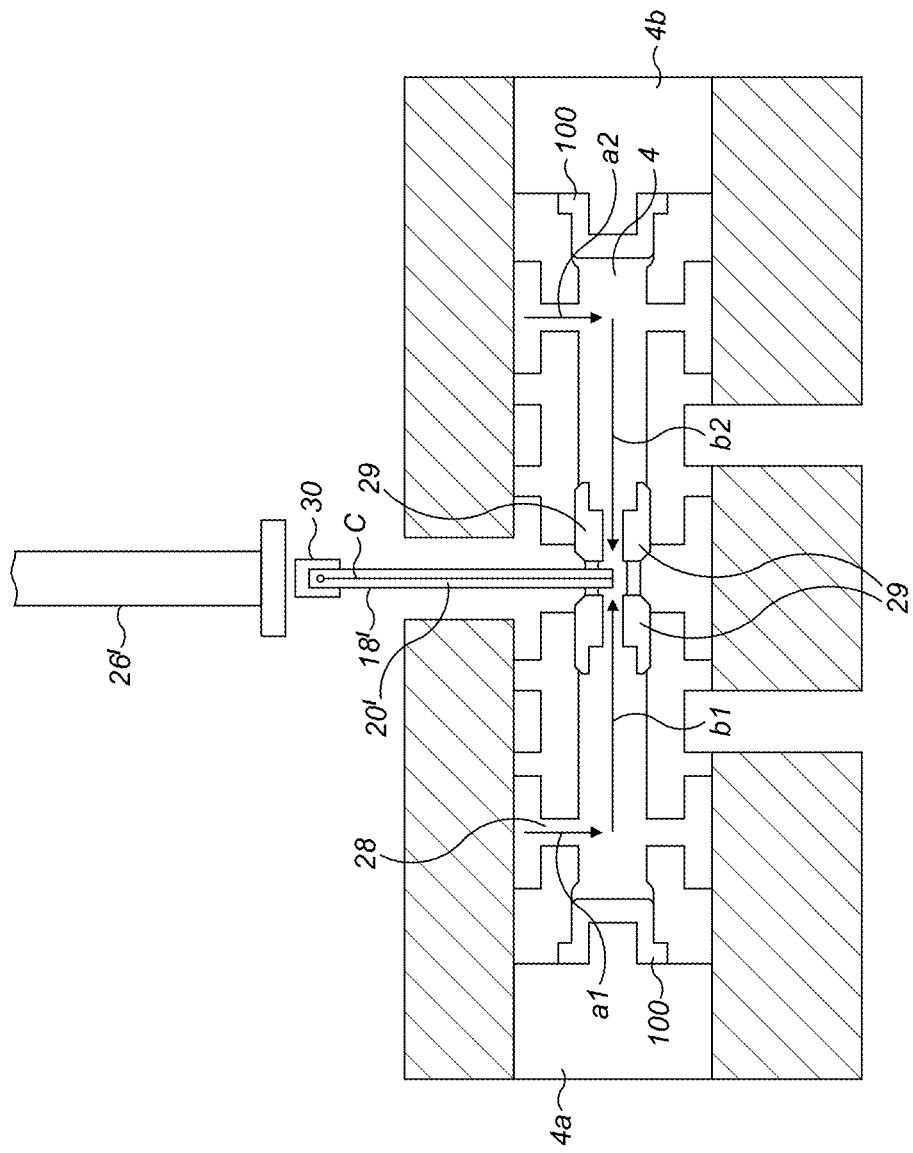
FIG. 2 is a cut-away view of a servovalve according to e.g. EP16461572.
Figure 2A:
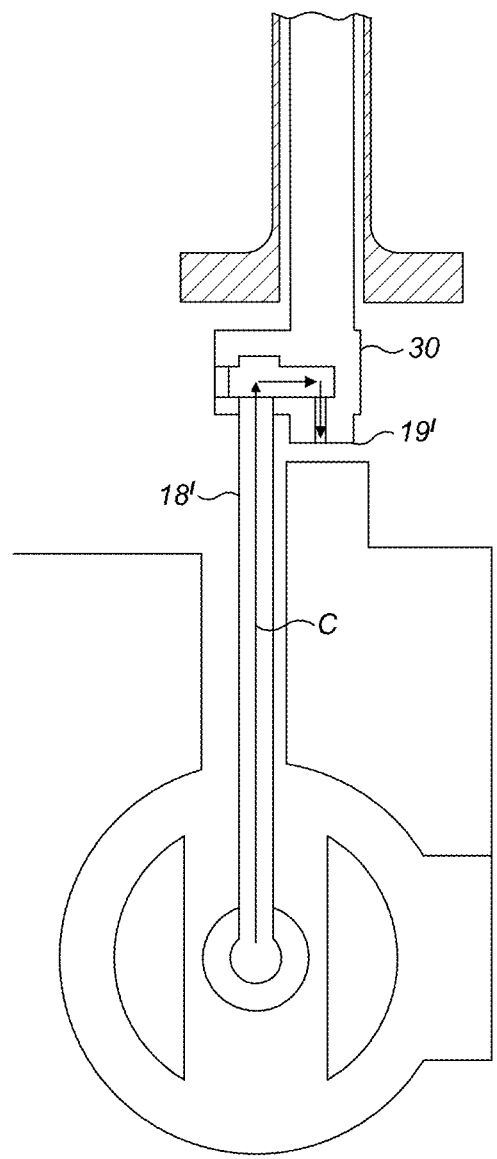
FIG. 2A is a detail of the servovalve of FIG. 2.

The servovalve assembly of EP 16461572, described with reference to FIGS. 2 and 2A, avoids the need for the supply pipe 25, thus avoiding many of the disadvantages of conventional jet pipe servovalves. Instead of providing supply fluid to the jet pipe externally, in the present disclosure the supply fluid is provided to the jet pipe from inside the servovalve assembly, using the flow of supply fluid provided to the spool supply ports. To do this, openings 28 are provided in the wall of the spool 4 to enable the supply fluid provided to the spool 4 via the supply port to flow inside the spool body as shown by arrows a1, a2 of FIG. 2. The jet pipe 18' extends into the interior of the spool 4 and is preferably secured in position e.g. by clamps or screws 29. The supply fluid, which is conventionally supplied at a pressure of around 10 mPa, but may of course be other pressure values including much higher pressures e.g. 21 MPa, flows into the interior of the spool 4 towards the middle (arrows b1,b2) and is drawn up, under pressure, into the end of the jet pipe 18' extending into the spool (arrow c). This end is in fluid engagement with the nozzle 19' as can best be seen in FIG. 2. Arrows d1 and d2 show how the fluid flows from the jet pipe 18' into the nozzle 19' from which it exits as in conventional systems to the receiver 21.

FIG. 2 shows, again by arrows, how the fluid flows from the supply port into the opening(s) 28 into spool 4 and then to the end of the jet pipe 18' extending into the spool. The spool body is sealed at each end by a respective end cap 100.

With this arrangement, the jet pipe 18' can be in the form of a pipe extending into the spool with a connector header piece 30 defining a flow channel from the jet pipe to the nozzle 19'. The header piece 30 can be formed integrally with the pipe or could be formed as a separate piece and attached to the pipe by e.g. brazing or welding. As only the header piece needs to be under pressure, making it as a separate component can be advantageous in terms of manufacturing.

Something is required to steer the nozzle 19' in response to motor current to control the valve by moving the spool. In conventional systems, this is provided by the body of the jet pipe extending out of the spool, preferably within a flexural tube. In the system of EP16461572 and of this disclosure, it is not necessary to have the externally extending jet pipe and so this could be replaced by e.g. a simple wire (not shown) which may be mounted in a flexural tube 26' and which is moved by the motor current to turn the nozzle to provide the desired flow to respective ends of the spool via the receiver.

The jet pipe, supplied by the spool thus also functions as the feedback spring needed in the conventional system.

Such a system has fewer component parts than conventional systems; there is less risk of leakage into the motor chamber as the supply pressure remains within the assembly; fewer connections and joints are required and the assembly can be smaller.

Figure 3:
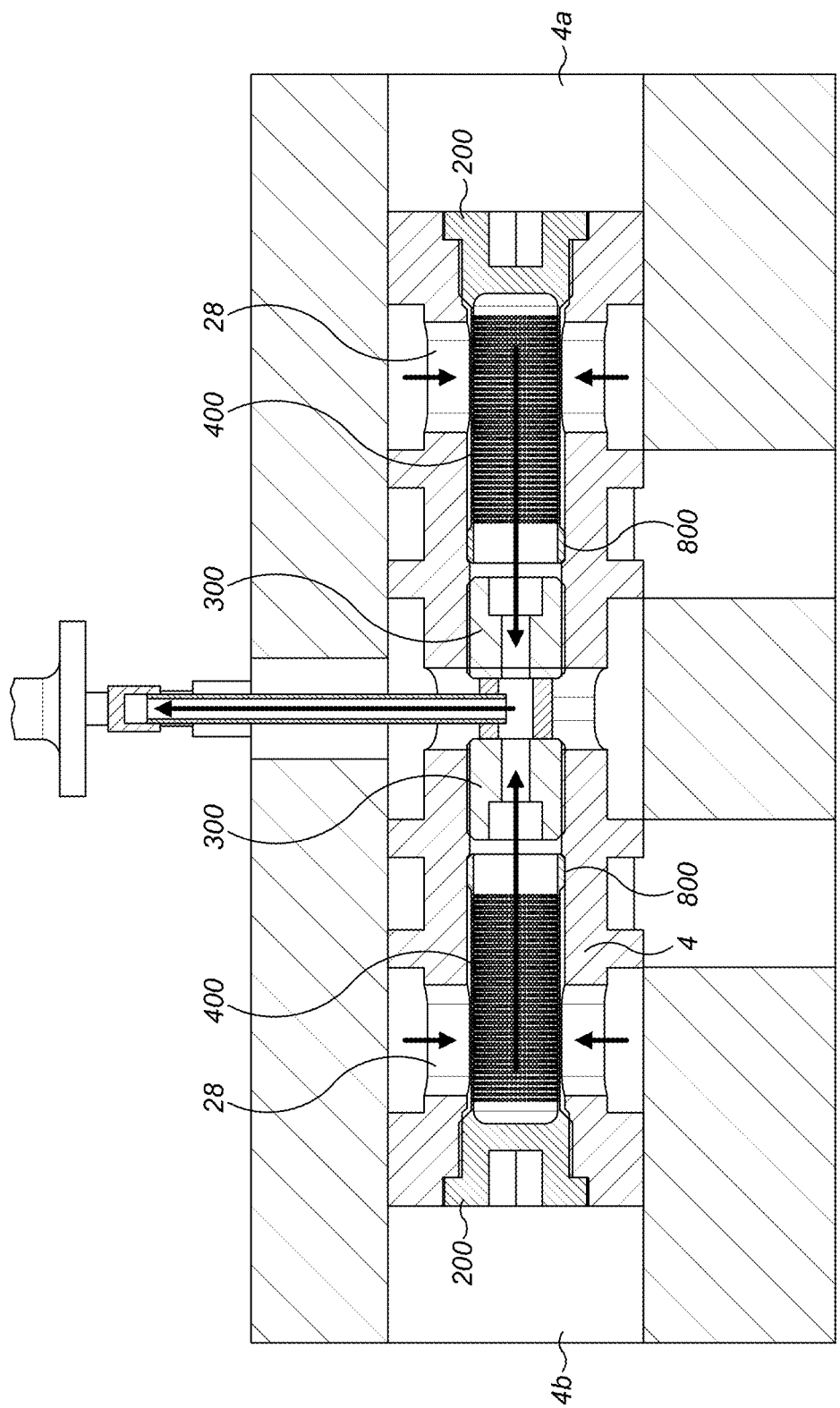
FIG. 3 is a partial sectional view of a servovalve according to the disclosure.

According to the present disclosure, the assembly described above is improved by providing means for filtering the fluid as it flows into the interior of the spool body via the openings. The filter means is therefore provided on or in the end caps 200 which are arranged to extend within the spool body at least as far as the opening(s) 28 where the fluid enters the interior to be supplied to the jet pipe. One embodiment, is shown in FIG. 3. The end caps 200, at least where they overlap the openings 28, are made to provide a filtration surface between the openings 28 and the interior of the spool 4 across which the fluid must pass before it enters the interior of the spool. In one example, the filtration surface is provided by perforations formed in a thin wall of the end caps 200 by e.g. laser or in any other known manner.

Figure 4:
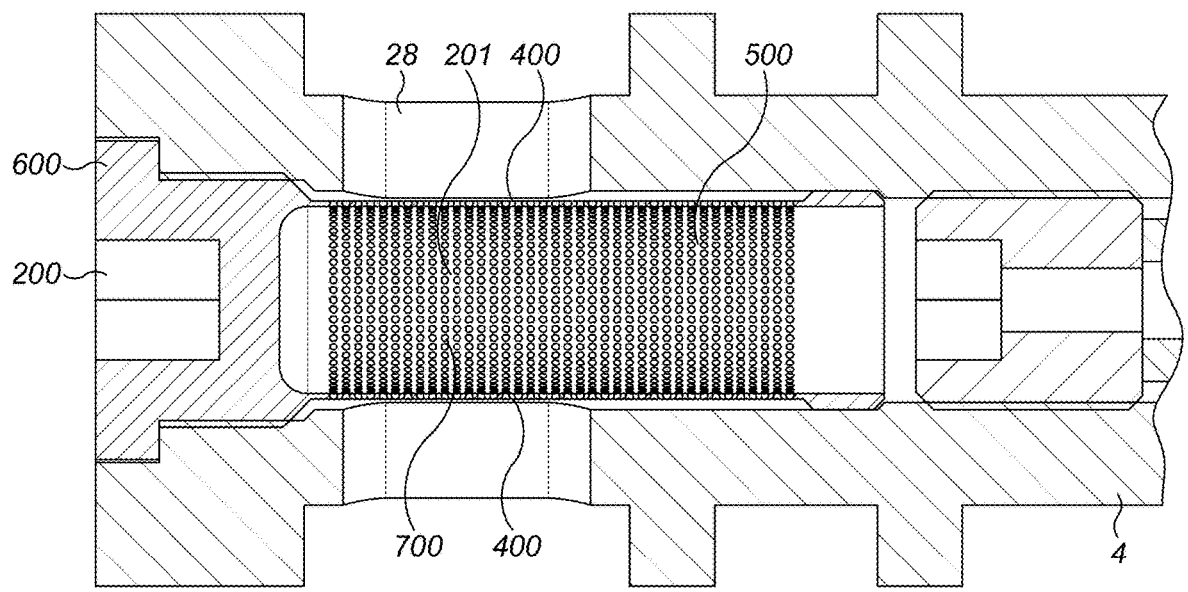
FIG. 4 is a detailed view of an end of the servovalve of FIG. 3.

FIG. 4 shows the filtration surface in more detail.

Figure 5:
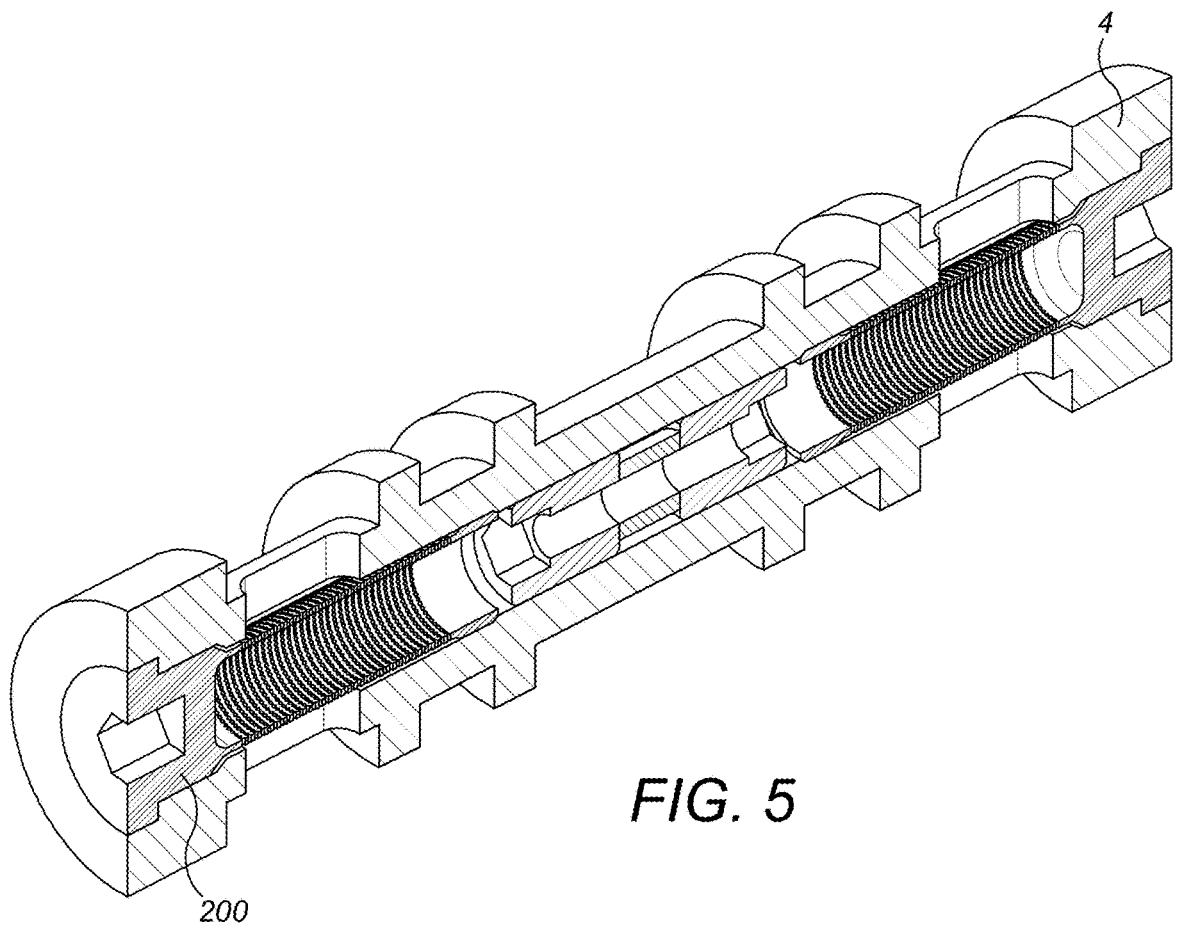
FIG. 5 is a cut-away view of the servovalve of FIG. 3

FIG. 5 shows a cross-section of the spool with the filtering end caps 200.

Referring to FIGS. 3, 4 and 5, the arrangement of the disclosure will be described by way of example. Where components correspond to conventional systems, the same references are used.

As in conventional servovalves, the spool 4 is a tubular or cylindrical body defined by a wall, which defines a passage for the fluid flow. The openings 28 are formed in the spool wall with, preferably, one opening close to each end 4a,4b of the spool body such that the fluid is controlled to act against the respective spool ends 4a,4b to appropriately move the spool as described above. This controls the flow of fluid from the control port.

Screws 300 are provided towards the centre of the spool body to hold the end of the jet pipe in place. The screws can be adjusted if necessary in view of system tolerances.

In conventional systems, the end caps 100 are provided as plugs or seals, made of e.g. steel, sealingly secured in the ends of the spool body to prevent leakage of fluid from those ends and to maintain the desired pressure differential across the spool.

In the arrangement of this disclosure, the end caps 200 are formed with a head 600 such as the conventional end caps 100 and a longer shaft 500 that extends further into the body of the spool when the caps are in place to plug the ends. The extended shaft 500 is a thin-walled (in one realisation approx. 0.2 mm) tubular shaft, also made of e.g. steel. The thin-walled shaft extends inside the tubular body past the openings 28 in the spool body wall providing a surface between the opening and the interior of the spool. The thin-walled shaft, at least at the position where the shaft overlaps the opening (but also possibly along more or all of the shaft) provides a filtration surface 400 to filter out particulate matter from the fluid as it passes from the opening into the interior of the spool 4. Most preferably, the filtration surface 400 is provided by perforations 700 formed in the thin wall of the end cap shaft 500, the perforations sized to prevent passage of debris/particulate matter, but to allow passage of the control fluid. One way of forming such perforations is by laser cutting but other methods are also possible.

It is important, for optimal filtering, to ensure that the radial clearance 800 between the spool body and the end cap 200 is very small—ideally smaller than the diameter of the perforations—to prevent fluid entering the opening and passing along a clearance gap between the spool and the end cap shaft and into the interior of the spool 4.

The end caps 200 must be sized to fit inside the spool body with a very small clearance therebetween—most preferably a clearance smaller than the size of the filter perforations, to prevent debris, particulate matter etc. escaping between the inner wall of the spool and the outer wall of the end caps rather than passing through the filter.

As compared to conventional servovalve arrangements with an additional filter component, the number of parts in the system of this disclosure is reduced, thus reducing cost, manufacturing time and complexity and scope for parts failure. A relatively large filtration area is possible providing more reliable and effective filtration. Further, no additional space is required in the valve assembly for a filter and so the overall size and weight of the assembly is minimised. The end caps are already part of the system. The filtration end caps are also easily accessible from outside the spool, easy to remove, clean and replace and so, in case of blockage or damage, it is not necessary to replace the whole assembly. It is also not necessary to undo the accurately adjusted screws 300 when removing the filter.

Although this disclosure has been described in terms of preferred examples, it should be understood that these examples are illustrative only and modifications and alterations are possible within the scope of the claims.

The invention claimed is:

1. A servovalve comprising:
   a fluid transfer valve assembly comprising a supply port and a control port;
   a moveable valve spool arranged to regulate flow of fluid from the supply port to the control port in response to a control signal; and
   a jet pipe assembly configured to axially move the valve spool relative to the fluid transfer valve assembly in response to the control signal to regulate the fluid flow, the jet pipe assembly comprising:
a steerable nozzle from which fluid is directed to opposing ends of the spool in an amount determined by the control signal;
wherein fluid is provided to the steerable nozzle via a connector header in fluid communication with an interior of the spool, the spool being provided with one or more openings via which fluid from the supply port enters the interior of the spool and flows from the interior of the spool into the jet pipe and into the connector header and to the nozzle, and wherein the jet pipe extends into the interior of the spool and is secured in position relative to the spool;
wherein the valve spool comprises:
a tubular body defining a path for fluid flow, the tubular body closed at each end by a respective end cap, wherein the end caps extend within the tubular body at least to an extent that they overlap the openings, and wherein the end caps are provided with filter means for filtering the fluid from the openings as the fluid enters the interior of the spool.

2. The servovalve of claim 1, wherein the filter means comprises perforations formed in the end cap where they overlap the openings.

3. The servovalve of claim 2, wherein the end caps comprise a head part configured to sealingly sit in the end of the spool and a shaft extending from the head part along the interior of the spool.

4. The servovalve of claim 1, wherein the end caps comprise a thin wall where they overlap the openings.

5. The servovalve of claim 1, wherein the openings comprise an opening provided towards each end of the spool.

6. The servovalve of claim 1, further comprising drive means for steering the nozzle in response to the control signal.

7. The servovalve of claim 1, wherein the nozzle is provided at an end of a jet pipe closest to the valve assembly and fluid from the nozzle is directed into the valve assembly via a receiver.

8. The servovalve of claim 7, wherein the receiver is configured such that when the nozzle is in a central position, fluid enters the fluid transfer valve assembly evenly via both sides of the receiver, when the nozzle is steered to an off-centre position, more fluid flows to one side of the fluid transfer valve assembly than the other via the receiver.

9. The servovalve of claim 7, wherein the receiver comprises lateral receiver channels to provide flow to each side of the fluid transfer valve assembly.

10. The servovalve of claim 1, wherein the connector header is formed integrally with the nozzle or wherein the connector header is formed as a separated component and attached to the nozzle.

11. The servovalve of claim 1, wherein the connector header comprises an inlet to receive supply fluid and an outlet in fluid communication with the nozzle.

12. The servovalve of claim 1, wherein the nozzle is provided on a jet pipe mounted within a flexible tube, wherein the tube imparts movement to the jet pipe to steer the nozzle in response to the control signal.

13. The servovalve of claim 12, wherein the jet pipe comprises a nozzle portion and a main body portion.

14. The servovalve of claim 13, wherein the main body portion is in the form of a tube or wherein the main body portion is in the form of a rod or wire.

* * * * *